1,482,463

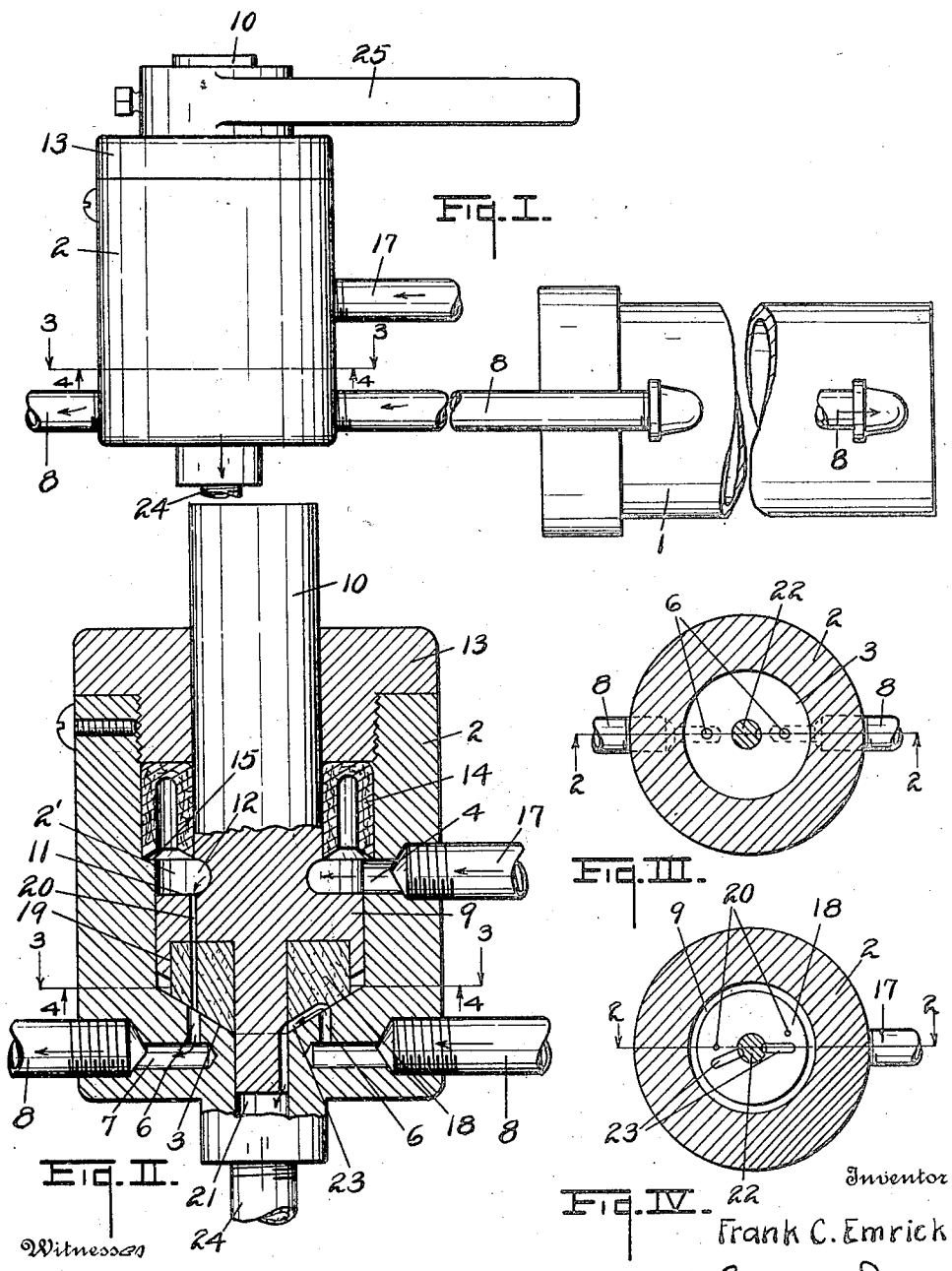
Feb. 5, 1924.
F. C. EMRICK
CONTROL VALVE FOR HYDRAULIC APPARATUS
Filed Oct. 12, 1920
1,482,463
Inventor
Frank C. Emrick Patented Feb. 5, 1924.

UNITED STATES PATENT OFFICE.

FRANK C. EMRICK, OF KALAMAZOO, MICHIGAN.

CONTROL VALVE FOR HYDRAULIC APPARATUS.

Application filed October 12, 1920. Serial No. 416,440.

*To all whom it may concern:*

Be it known that I, FRANK C. EMRICK, a citizen of the United States, residing at the city and county of Kalamazoo, and State of Michigan, have invented certain new and useful Improvements in Control Valves for Hydraulic Apparatus, of which the following is a specification.

This invention relates to improvements in control valves for hydraulic apparatus.

The main objects of this invention are:

First, to provide an improved control valve for hydraulic power apparatus which is easily operated even when the controlled fluid is under high pressure.

Second, to provide an improved valve for hydraulic power apparatus which is simple and compact in structure and very durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a side elevation of my improved valve, a hydraulic cylinder being associated therewith to illustrate the operative relation of the valve.

Fig. II is a detail view mainly in central section on line corresponding to line 2—2 of Figs. III and IV.

Fig. III is a transverse section on a line corresponding to broken line 3—3 of Figs. I and II.

Fig. IV is a transverse section on line corresponding to broken line 4—4 of Figs. I and II.

In the drawing, similar reference characters refer to similar parts throughout the several views, and the sectional views are taken looking in the direction of the little arrows at the ends of the section lines.

Referring to the drawing, 1 represents the power cylinder of a hydraulic apparatus, the same being shown conventionally. My improved valve comprises a casing 2 having a cylindrical chamber 2′ therein with a conical valve seat 3 at its lower end. The valve casing is provided with a supply port 4 at one side opening into the valve chamber above the valve seat and the power member ports 6, 6 communicating with pipes 8 to the opposite ends of the power cylinder 1. The ports 6 open into the face of the valve seat 3.

The cylindrical valve 9 is provided with a stem 10, there being a shoulder 11 at the base of the stem and an annular recess 12 above the shoulder. The packing gland 13 is provided with the packing member 14 of U-shape in cross section disposed facing inwardly. The valve casing is provided with a shoulder-like seat 15 for this packing member, the packing member coacting with the shoulder and recess 12 of the valve to provide an annular passage 2′ communicating with the inlet passage 4. The passage 4 is connected to the pump or other suitable source of supply by the pipe 17.

The valve is provided with a facing 18, preferably of hard fibre, the facing coacting with the seat and being arranged in an annular recess 19 in the lower end of the valve. The passages 20 are disposed longitudinally of the valve opening into the annular recess 12 and are disposed so that they may be alternately brought into register with the passages 6 as the valve is oscillated or rotated. A return passage 21 is disposed centrally of the seat. The valve is provided with an axial extension 22 projecting into this passage 21. The valve facing and this stem are provided with exhaust passages 23 disposed so that they are alternately brought into register with the power member ports 6 as the valve is oscillated. The passage 21 is connected by the pipe 24 to the pump. A hand lever 25 or other operating connections is provided for the valve stem.

With this arrangement of parts the valve is economical to produce and assemble, is very compact, and is very easily operated owing to the arrangement of the passages whereby the pressure on the valve is to a considerable degree balanced.

The valve is very durable, the hard fiber in bearing contact with the seat securing an effective seal and minimizing wear. In the event of any particle of iron or sand or the like getting under the valve it will become embedded in the facing rather than score the seat.

I have illustrated and described my improvements in a form which I have found very practical. I have not attempted to illustrate certain modifications and adaptations which I contemplate as I believe the disclosure made will enable those skilled in the art to which my invention relates to embody or adapt the same as may be desired.

Having thus described my invention, what I claim as new and desire to secure by Letters Patent, is:

1. In a control valve for hydraulic power apparatus, the combination of a valve casing having a cylindrical valve chamber provided with a conical valve seat at its lower end and having a supply passage above its said seat and power member ports opening into the face of said seat and a return passage disposed centrally of said seat, a cylindrical valve rotatable in said casing and provided with a stem at its upper end and with an axially disposed extension at its lower end and projecting into said return passage, said valve being shouldered at the base of the stem and having an annular recess at its shoulder, a packing member for said stem of U-cross section disposed facing said shoulder and coacting therewith and with said recess to provide an annular passage communicating with said supply passage, and a hard fiber facing for said valve coacting with said valve seat, said valve facing having a longitudinal passage therein opening in said shoulder and adapted to be brought into register with said power member ports alternately, said valve facing and valve extension having exhaust passages therein adapted to be alternately brought into register with said power member ports, said exhaust passages communicating with said return passage.

2. In a control valve for hydraulic power apparatus, the combination of a valve casing having a valve chamber provided with a conical valve seat at its lower end and having a supply passage above its said seat and power member ports opening into the face of said seat and a return passage disposed centrally of said seat, a valve rotatable in said casing and provided with a stem at its upper end and with an axially disposed extension at its lower end and projecting into said return passage, there being an annular passage at the base of the stem communicating with said supply passage, and a hard fiber facing for said valve coacting with said valve seat, said valve and facing having a longitudinal passage therein opening into said annular passage and adapted to be brought into register with said power member ports alternately, said valve facing and valve extension having exhaust passages therein adapted to be alternately brought into register with said power member ports, said exhaust passages communicating with said return passage.

3. In a control valve for hydraulic power apparatus, the combination of a valve casing having a cylindrical valve chamber provided with a conical valve seat at its lower end and having a supply passage above its said seat and power member ports opening into the face of said seat and a return passage disposed centrally of said seat, a cylindrical valve rotatable in said casing and provided with a stem at its upper end and with an axially disposed extension at its lower end and projecting into said return passage, said valve being shouldered at the base of the stem and having an annular recess at its shoulder, and a packing member for said stem of U-cross section disposed facing said shoulder and coacting therewith and with said recess to provide an annular passage communicating with said supply passage, said valve having a longitudinal passage therein opening into said annular passage and adapted to be brought into register with said power member ports alternately, said valve and valve extension having exhaust passages therein adapted to be alternately brought into register with said power member ports, said exhaust passages communicating with said return passage.

In witness whereof, I have hereunto set my hand and seal in the presence of two witnesses.

FRANK C. EMRICK [L. S.]

Witnesses:
 LUELLA G. GREENFIELD,
 MARGARET L. GLASGOW.